United States Patent [19]

Furukawa

[11] Patent Number: 5,400,451
[45] Date of Patent: Mar. 28, 1995

[54] KNIFE

[76] Inventor: Shiro Furukawa, 1619-10, Sagamikomachi-Yose, Tsukui-gun, Kanagawa-ken, Japan

[21] Appl. No.: 118,040

[22] Filed: Sep. 8, 1993

[30] Foreign Application Priority Data

Sep. 21, 1992 [JP] Japan .................. 4-251483

[51] Int. Cl.6 .................. B25F 1/00; A01K 97/26
[52] U.S. Cl. .................. 7/106; 7/118
[58] Field of Search .................. 7/106, 118, 168; 43/1

[56] References Cited

U.S. PATENT DOCUMENTS

| | | | |
|---|---|---|---|
| 1,268,558 | 6/1918 | Faix | 7/118 |
| 1,467,661 | 9/1923 | Undy | 7/118 |
| 1,828,121 | 10/1931 | Adam et al. | 7/118 X |

Primary Examiner—D. S. Meislin
Attorney, Agent, or Firm—Koda and Androlia

[57] ABSTRACT

A knife storing a fly-tying vice which is capable of securing a hook easily. The fly-tying vice includes two arms having their respective mouth pieces at one end for clamping a hook, and a main screw for bringing the two arms closer to each other and for allowing the mouth pieces to clamp the hook. A hackle-plyer includes a wrench hole being engaged with the top end of the main screw so as to turn the main screw for tightening. The main screw is turned lightly by hand, and whereby the hook is clamped by the mouth pieces. Then, the wrench hole is fit into the top end of the main screw and turned. Thus, a fly is firmly secured by the mouth pieces.

7 Claims, 4 Drawing Sheets

KNIFE

BACKGROUND OF THE INVENTION

1. Field of the Invention

The present invention relates to a knife which stores tools such as a fly-tying vice, and the like, for producing a fly for fly fishing.

2. Description of the Related Art

Various types of tools for producing a fly for fly fishing are available. The important members among them are a fly-tying vice for clamping and securing a hook, which is one of the components forming a fly, a hackle-plyer for pinching and supporting a hackle (a feather of a chicken or the like) which will be wound around a hook with a thread, scissors for cutting a hackle or thread, and a half-hitcher for hitching the thread around the hook and for fastening after a hackle or the like is wound around the hook by the thread.

FIG. 4 shows one example of the operation for producing a fly by using such tools. A hook 802 is clamped and secured by a mouth piece 801 positioned on the top end of a fly-tying vice. A hackle 803 is pinched and supported by a hackle-plyer 804, and it is drawn closer to the hook 802. Thread 806 is pulled out from the top end of a bobbin holder 805 containing a bobbin around which the thread is wound, thereby fastening the hook 802 and the hackle 803 together. Thus, a desired fly is produced.

Among various types of tools for producing a fly, the fly-tying vice is bulky. For example, a bench vice used for producing a fly indoors has a pedestal, which is laid on a table or the floor. In this condition, the hook is clamped and secured by the mouth pieces for producing a fly.

However, the fly-tying vice is too bulky to be carried easily for producing a fly outdoors, such as to a fishing place. In addition, when an operator produces a fly while standing, he has to take the trouble of putting the fly-tying vice in a belt, or the like and taking it out again.

Therefore, it is convenient to store a fly-tying vice in a knife, which is essentially carried, to go to a river for fishing, or the like. If a knife is constructed such that the fly-tying vice is supported by a handle of the knife, the handle can be held by the two or three fingers of one hand, and thus, it is possible to carry out the operation for producing a fly with the remaining the 7 or 8 fingers. Hence, an operator is even able to produce a fly while standing.

Also, in order to store the fly-tying vice in the knife, it is essential that the fly-tying vice be made in a compact-sized. To achieve this, the fly-tying vice is required to be constructed such that two arms of the fly-tying vice having mouth pieces, respectively, on the top end are screwed, thereby clamping the hook.

FIG. 3 shows one example of a knife constructed in the above-mentioned manner, and also shows a fly-tying vice stored in the knife. A knife generally denoted by 901 is a clasp knife, and a knife blade (not shown) is stored in a handle 902. The handle 902 is provided with a fly-tying vice storing portion 904 for storing a fly-tying vice 903. The fly-tying vice 903 is pivotably supported at one end by the handle 902 around a vice pivoting pin (not shown). The fly-tying vice 903 is constructed such that two arms 905 and 906 having two mouth pieces 908 and 909 on the top end are screwed by a screw 907, and that the hook is clamped and secured by the mouth pieces 908 and 909.

As stated above, the fly-tying vice in FIG. 3 is formed of the two arms and the screw. However, the screw is required to be made small for want of space because it is stored in a knife. Thus, it is difficult to tighten the top end of the screw manually, and therefore, the hook cannot be secured firmly. Since the operation of producing a fly requires accuracy and precision, it is essential that the hook be firmly secured by the fly-tying vice.

SUMMARY OF THE INVENTION

Accordingly, an object of the present invention is to provide a knife storing a fly-tying vice which is capable of securing a hook easily.

Further objects, features and advantages of the present invention will become apparent from the following description.

To achieve the above objects, the present invention provides a knife comprising: a knife blade; a handle storing the knife blade; and a fly-tying vice stored in the handle and supported by the handle when it is pulled out; the fly-tying vice including two arms forming their respective mouth pieces at one end for clamping a hook; a screw portion disposed adjacent to the mouth pieces of the arms for bringing the two arms closer to each other so as to allow the two mouth pieces to clamp the hook; and screw tightening tool stored in the handle for turning the screw portion for tightening. The operation for using such a knife will be given. The screw portion is first turned manually so that the two arms are brought closer to each other, thereby clamping the hook lightly with the mouth pieces of the arms. Then, the screw portion is turned by the screw tightening tool stored in the handle so as to be tightened more firmly, thereby clamping and securing the hook firmly by the mouth pieces. Thus, the screw portion can be tightened easily by the screw tightening tool. The fly-tying vice can be formed to be in a compact-sized so as to be stored in the handle, and accordingly, the screw portion can be made small without impairing the firm securing of the hook.

The screw tightening tool may be a wrench for engaging the top end of the screw portion and for turning the top end so as to tighten the screw portion.

The present invention also provides a knife comprising: a knife blade; a handle storing the knife blade; and a fly-tying vice stored in the handle and supported by the handle when it is pulled out; the fly-tying vice including two arms forming their respective mouth pieces at one end for clamping a hook; a screw portion disposed adjacent to the mouth pieces of the arms for bringing the two arms closer to each other so as to allow the two mouth pieces to clamp the hook; and screw tightening tool stored in the handle for turning the screw portion for tightening; and the handle storing at least one of scissors, a hackle-plyer and a half-hitcher. According to this invention, since the hackle-plyer, the scissors and the half-hitcher are stored in the handle, a single knife includes the basic tools required for producing a fly. Thus, it is convenient to carry such a knife outdoors rather than to carry the individual tools for producing a fly.

The screw tightening tool may be arranged in one of the scissors, the hackle-plyer and the half-hither stored in the handle.

The present invention further provides a knife comprising: a knife blade; a handle storing the knife blade;

and a fly-tying vice stored in the handle and supported by the handle when it is pulled out; the fly-tying vice including two arms forming their respective mouth pieces at one end for clamping a hook; a screw portion disposed adjacent to the mouth pieces of the arms for bringing the two arms closer to each other so as to allow the two mouth pieces to clamp the hook; a screw tightening tool stored in the handle for turning the screw portion for tightening; and spacing adjusting means for adjusting spacing between the two arms in order to prevent the spacing between the two arms closer to the other end than to the screw portion of the two arms from being made narrower than the desired spacing. According to this invention, the spacing adjusting means is able to prevent the hook from being not clamped and secured fully, which might be caused by the following reason. The two arms are tilted, thereby making the spacing between the two arms adjacent to the mouth pieces wider and making the spacing therebetween on the opposite position narrower. Thus, the overall spacing between the two arms can be maintained equally.

The present invention still further provides a knife comprising: a knife blade; a handle storing the knife blade; and a fly-tying vice stored in the handle and supported by the handle when it is pulled out; the fly-tying vice including two arms forming their respective mouth pieces at one end for clamping a hook; a screw portion disposed adjacent to the mouth pieces of the arms for bringing the two arms closer to each other so as to allow the two mouth pieces to clamp the hook; a screw tightening tool stored in the handle for turning the screw portion for tightening; and an elastic member disposed between the two arms closer to the other end than the screw portion, the elastic member urging the two arms away from each other. Since the elastic member is included in this invention, the operation of producing a fly can be carried out easily by the following process. The screw portion is turned slightly. The hook is temporarily clamped, and then moved to a desired position manually by an operator. Subsequently, the screw portion is tightened firmly, thereby securing the hook to the mouth pieces.

The fly-tying vice may include guide pins arranged on both sides of the screw portion of one arm for guiding the clamping operation of the mouth pieces and guide holes for receiving the guide pins, the guide holes arranged on the other arm.

BRIEF DESCRIPTION OF THE DRAWINGS

FIG. 4 shows one example of the operation for producing a fly by using a conventional tool such as a fly-tying vice, or the like.

DESCRIPTION OF THE PREFERRED EMBODIMENTS

Figure 1:
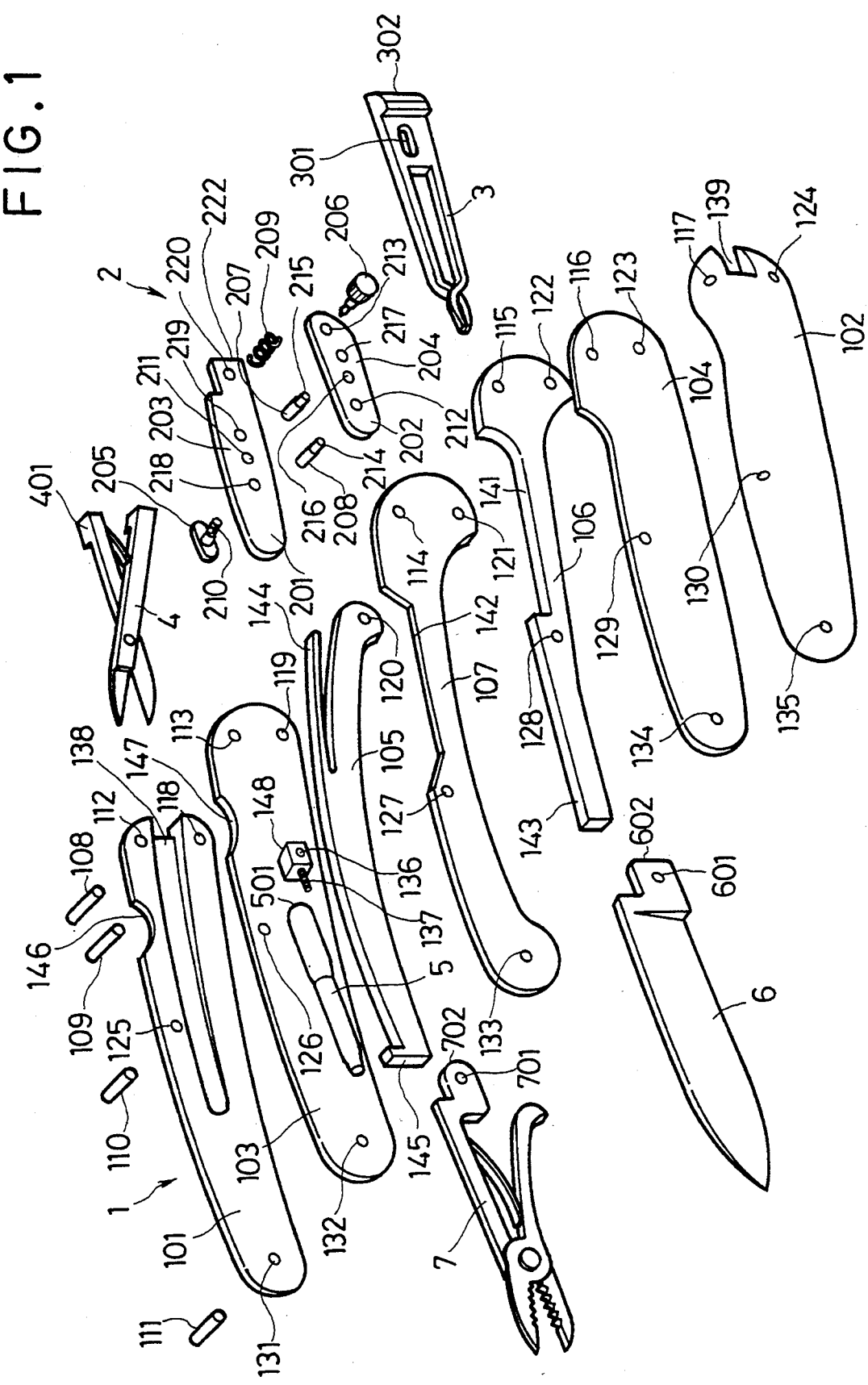
FIG. 1 is an exploded view showing a knife of an embodiment according to the present invention.
Figure 2A:
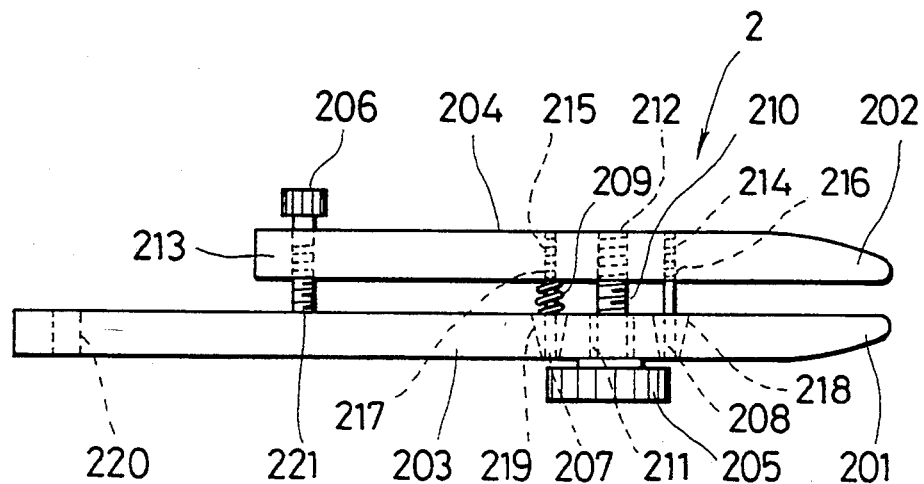
FIG. 2A is a front view showing a fly-tying vice in the knife of the embodiment according to the present invention.
Figure 2B:
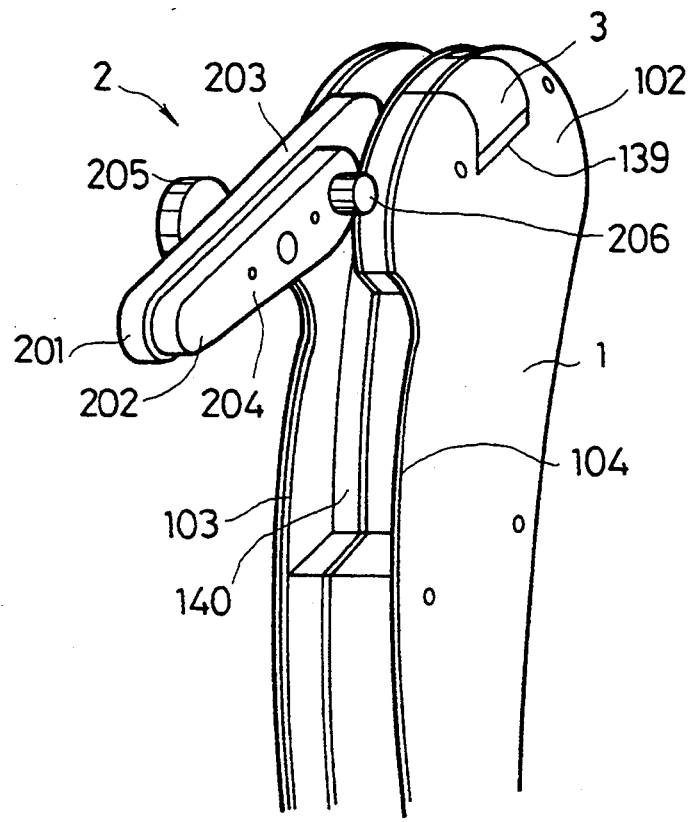
FIG. 2B is a perspective view showing the fly-tying vice being pulled out of a fly-tying vice storing portion formed in the handle of the knife of the embodiment according to the present invention.

A description of an embodiment of the present invention will be given with reference to the drawings. FIG. 1 is an exploded view showing a construction of a knife of an embodiment according to the present invention. The knife of the present embodiment includes a fly-tying vice generally denoted by 2. FIG. 2A is a front view of the fly-tying vice 2 and shows the details of the construction thereof. FIG. 2B is a perspective view of the fly-tying device 2.

The construction of the knife of the present invention will now be described in detail. The knife of this embodiment includes a handle generally denoted by 1. The handle 1 is formed of the following members which are assembled and connected to each other in an order beginning from the outward to the inward direction. Handle covers 101 and 102 are each placed outwardmost, followed by each of the liner plates 103 and 104, and each of the springs 105 and 106. A partition liner plate 107 is placed in the center. More specifically, as illustrated in FIG. 1, these members are assembled by a vice pivoting pin 108 inserted through vice pivoting pin holes 112–117, a spring securing pin 109 inserted through spring securing pin holes 118–124, another spring securing pin 110 inserted through other spring securing pin holes 125–130, and a blade-plyer pivoting pin 111 inserted through blade-plyer pivoting pin holes 131–135 in the order of one of the handle covers 101, one of the liner plates 103, one of the springs 105, the partition liner plate 107, the other spring 106, the other liner plate 104, and the other handle cover 102 so as to form the handle 1.

A scissors storing portion 138 is arranged in the form of a groove on the side of the handle cover 101 facing the liner plate 103. A pair of scissors 4 are fitted and stored in such a scissors storing portion 138. A notch is also formed in the inlet of the scissors storing portion 138. Likewise, a hackle-plyer storing portion 139 is arranged in the form of a groove on the side of the handle cover 102 facing the liner plate 104. A hackle-plyer 3 is fitted and stored in such a hackle-plyer storing portion 139. A notch is also formed in the inlet of the hackle-plyer storing portion 139 as in the scissors storing portion 138.

The spring 105 stretches in an arch-like shape and is formed of an elastic material. It includes an arch-like spring portion 144 at its one end for urging a base end 222 of the fly-tying vice 2 and a nipper supporting portion 145 at the other end for urging a base end 702 of a nipper 7.

The spring 106 and the partition liner plate 107 have notches 141 and 142, respectively, thereby forming a fly-tying vice storing portion 140 for storing the fly-tying vice 2. The spring 106 has a knife urging portion 143 at its one end for urging a base end 602 of a knife blade 6.

The handle cover 101 and the liner plate 103 include arch-like notches 146 and 147, respectively, so that the fly-tying vice 2 can be easily pulled out of the fly-tying vice storing portion 140.

The fly-tying vice 2 is composed of two arms 203 and 204, a main screw 205, a subsidiary screw for subtle-adjusting 206, two parallel pins 207 and 208, and a spring portion 209. The two arms 203 and 204 have mouth pieces 201 and 202, respectively, at one end for clamping a hook. The main screw 205 includes a male screw portion 210 which is inserted with some play into a hole 211 arranged in the arm 203 and which is inserted into a screw hole 212 of the arm 204, thereby connecting the arms 203 and 204 relatively. The subsidiary screw 206 is inserted into a screw hole 213 arranged in the arm 204. The parallel pins 207 and 208 include the respective male screw portions 214 and 215 at one end and are inserted into the respective screw holes 216 and 217 arranged in the arm 202 and secured therein. The parallel pins 207 and 208 also include the other ends which are inserted into tapered holes 218 and 219, respectively, arranged in the arm 203. The spring 209 is disposed between the arms 203 and 204 guided by the parallel pin 207. The vice pivoting pin 108 of the handle 1 is inserted into a hole 220 of the arm 203, and thus, the fly-tying vice 2 having the construction described above is supported pivotably by the handle 1.

Referring to FIG. 2B, when the fly-tying vice 2 is not used, it is stored in the fly-tying vice storing portion 140 formed between the liner plates 103 and 104. It can be manually pulled out of the fly-tying vice storing portion 140 for use. Since the fly-tying vice 2 is pivotably supported by the handle 1, it can be used while the handle 1 is held with one hand. The spring portion 144 urges the base end 222 of the fly-tying vice, thereby preventing the fly-tying vice 2 from popping out accidentally when it is stored in the fly-tying vice storing portion 140 and from being loose when it is out.

Referring to FIG. 2A, the main screw 205 bring the arms 203 and 204 closer to each other so as to clamp a hook by the mouth pieces 201 and 202.

The subsidiary screw 206 is turned manually, thereby pressing the arm 203 with its top end 221. The subsidiary screw 206 is arranged adjacent to the base end 222 of the fly-tying vice 2 which is closer to the handle 1 than the main screw 205 is, that is, adjacent to the hole 220 for supporting the fly-tying vice 2 by the handle 1. Therefore, the subsidiary screw 206 is capable of preventing the spacing between the arms 203 and 204 adjacent to the hole 220 from being narrower than the desired spacing, which might be caused by the following reason. When the hook is clamped and secured by the mouth pieces 201 and 202, the arms 203 and 204 are tilted, thus making the spacing between the arms 203 and 204 adjacent to the mouth pieces 201 and 202 wider and the spacing therebetween adjacent to the hole 220 narrower. As a result, the hook cannot be fully clamped and secured. In order to prevent such inconvenience, the subsidiary screw 206 is arranged for maintaining the overall spacing between the arms 203 and 204.

The parallel pins 214 and 215 function for guiding the clamping operation of the arms 203 and 204. The spring portion 209 is disposed between the arms 203 and 204 closer to the base end than the main screw 205 is, that is, adjacent to the hole 220, guided by the parallel pin 215. The spring portion 209 urges the arms 203 and 204 adjacent to the hole 220, thereby applying a force to the arms 203 and 204 so as to make the spacing between the arms 203 and 204 adjacent to the hole 220 wider and to make the spacing therebetween adjacent to the mouth pieces 201 and 202 narrower. Accordingly, when the main screw 205 is slightly turned manually, the hook is lightly clamped by the mouth pieces 201 and 202, and does not come off easily when a slight force is applied. That is, the hook can be temporarily clamped. After the hook is temporarily clamped, it can be moved to a desired position by the fingers by an operator while it is clamped by the mouth pieces 201 and 202. Subsequently, the mouth pieces 201 and 202 are further screwed tightly by the main screw 205 with fingers, thereby securing the hook to the mouth pieces 201 and 202. The holes 218 and 219 for receiving the guide pins 214 and 215 are tapered in order to compensate for the following disadvantage. The arms 203 and 204 might be tilted by the above-mentioned temporary clamping, which might make the spacing between the arms 203 and 204 adjacent to the mouth pieces 201 and 202 wider and make the spacing therebetween adjacent to the hole 220 narrower.

The hackle-plyer 3 is fitted and stored in the hackle-plyer storing portion 139, and pulled out thereof manually for use. The hackle-plyer 3 includes a wrench hole 301 which is formed to be fit into the top end of the main screw 205 of the fly-tying vice 2. Thus, the wrench hole 301 is fit into the top end of the main screw 205 and the hackle-plyer 3 is pivoted, thereby clamping the hook securely by the mouth pieces 201 and 202. That is, the wrench hole 301 functions in the form of a wrench for turning the main screw 205 tightly. The hackle-plyer 3 also includes a projection 302 at its one end. As described above, the hackle-plyer storing portion 139 forms a notch at the inlet, and the projection 302 is engaged with such a notch, whereby the hackle-plyer 3 can be easily pulled out of the hackle-plyer storing portion 139 with the fingers.

Figure 3:
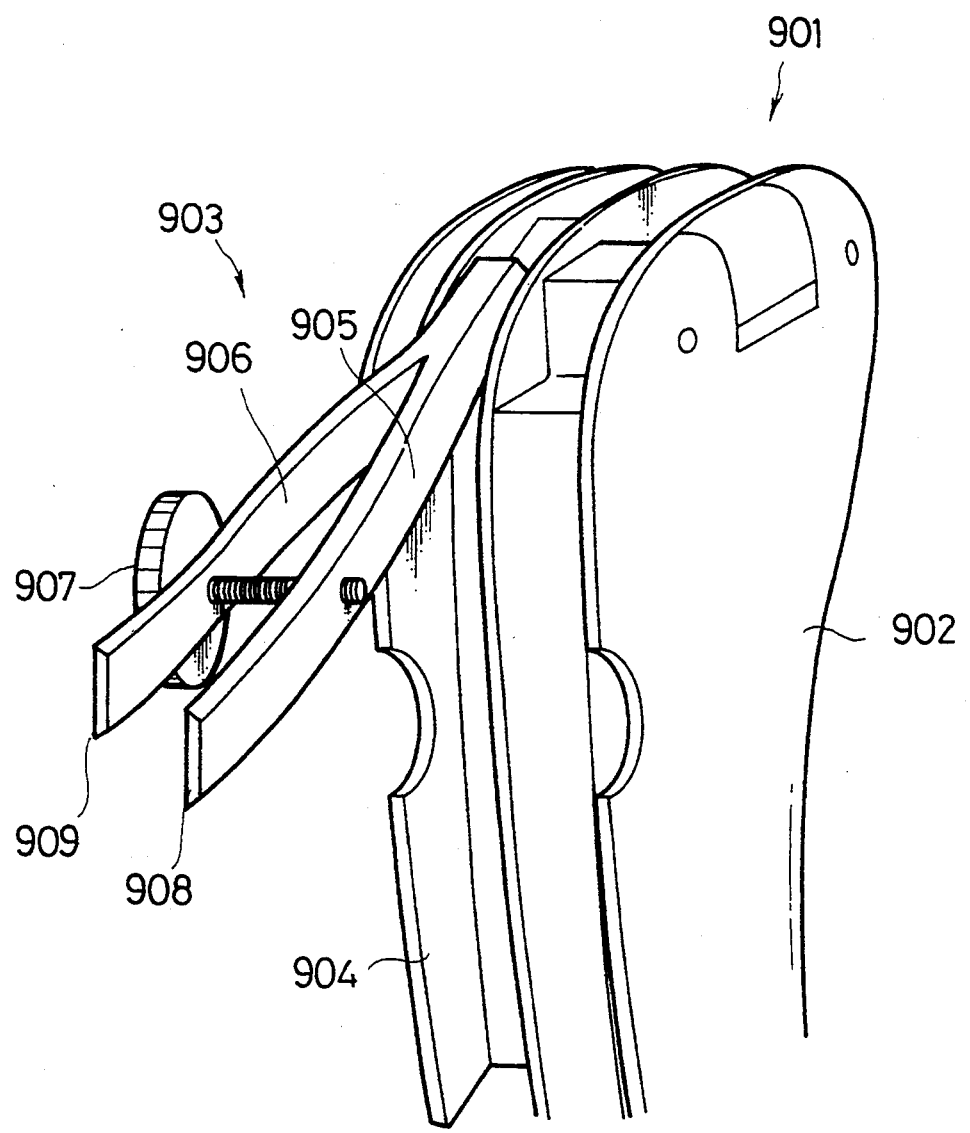
FIG. 3 is an imaginary view showing an example of a knife which is capable of storing a fly-tying vice constructed such that two arms are screwed and include the respective mouthpieces on the top end, thereby clamping a hook.
Figure 4:
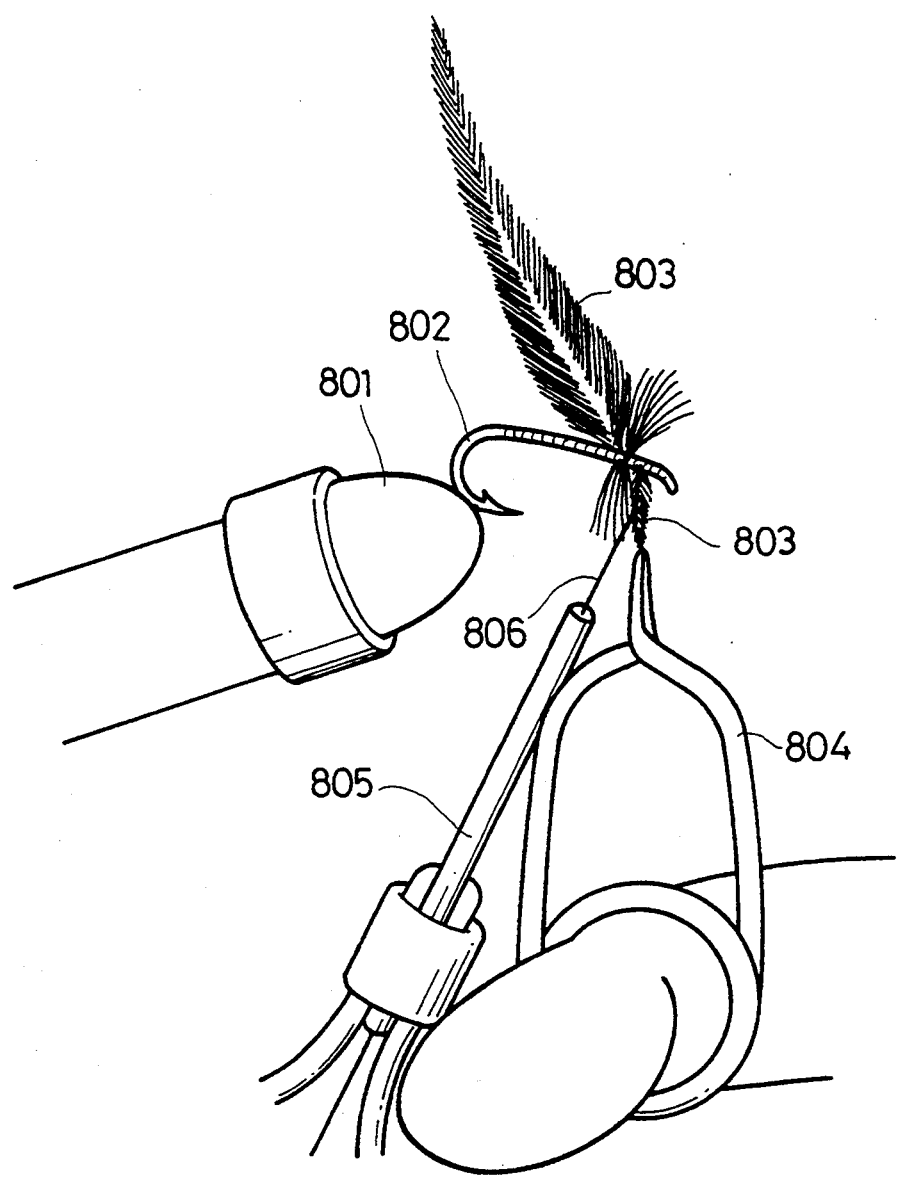

As will be clearly understood from the foregoing description, in order to store a fly-tying vice in a knife, the fly-tying vice is required to be in a compact-sized. To achieve this, the fly-tying vice is desirably constructed as in the knife of the present embodiment. More specifically, the two arms 203 and 204 of the fly-tying vice 2 are adapted to have the respective mouth pieces 201 and 202 at the top end and are screwed by the main screw 205, thereby clamping the hook. However, as illustrated in FIG. 3, the fly-tying vice 2 is formed of the two arms 203 and 204, and the main screw 205, and the main screw 205 is required to be made small for want of space because the fly-tying vice 2 is adapted to be stored in the knife. Thus, it is difficult to tighten the top end of the main screw 205 manually, and therefore, the hook cannot be secured firmly. The operation of producing a fly requires accuracy and precision. It is essential that the hook be secured firmly by the fly-tying vice. Otherwise, the fly-tying vice cannot be applied to for practical use. Thus, the use of the wrench hole 301 of this embodiment facilitates the operation of the main screw 205, and the above-mentioned problem can be avoided.

A half-hitcher supporting member 148 for supporting a half-hitcher 5 has a hole 136 for receiving the spring securing pin 110, whereby it is pivotably supported between the liner plate 103 and the partition liner plate 107. The half-hitcher supporting member 148 includes a male screw 137 and the half-hitcher 5 includes a female screw 501 at its one end for connection, thereby supporting the half-hitcher 5 by the half-hitcher supporting member 148. When the half-hitcher 5 is not used, it is stored in a half-hitcher storing portion (not shown) formed between the liner plate 103 and the partition liner plate 107. It is pulled out of the storing portion manually and then removed from the half-hitcher supporting member 148 for use. The half-hitcher supporting member 148 is urged by the elasticity of the spring 105 in order to prevent the half-hitcher 5 from popping out accidentally when it is stored in the half-hitcher storing portion (not shown).

The scissors 4 are fitted and stored in the scissors storing portion 138 formed between the handle cover 101 and the liner plate 103. They are pulled out of the scissors storing portion 138 manually for use. The hackle-plyer 3 is likewise fitted and stored in the hackle-plyer storing portion 139 formed between the handle cover 102 and the liner plate 104, and it is pulled out manually for use. The scissors 4 also include a projection 401 at one end as in the hackle-plyer 3. Such a projection 401 is engaged with the notch formed at the inlet of the scissors storing portion 138 as stated above, whereby the scissors 4 can be easily pulled out of the scissors storing portion 138 with the fingers.

The present invention may be modified such that the foregoing hackle-plyer 3, the scissors 4 and the half-hitcher 5 are not stored in the knife whatsoever. Or it may be modified such that only one or two of the above members are stored in the knife. However, if the present invention is constructed to store all the members in the knife, then, the knife will include basic tools required for producing a fly. Thus, it is extremely convenient to carry such a single knife outdoors rather than to carry individual tools for producing a fly.

Further, the present invention may be modified such that the wrench hole 301 is not arranged in the hackle-plyer 3, but instead, an independent member having the wrench hole 301 may be stored in the knife, or the wrench hole 301 may be arranged in the scissors 4 and/or the half-hitcher 5 stored in the knife. However, the use of an independent member having a wrench hole 301 increases the number of members stored in the knife needlessly. Also, according to the shape of the wrench hole 301, it is more advantageous to be arranged in the hackle-plyer 3 rather than in the scissors 4 and/or the half-hitcher 5 with a view to the easy operation of the main screw 205.

The knife blade 6 has a hole 601 for receiving the blade-plyer pivoting pin 111, and whereby it is supported pivotably between the partition liner plate 107 and the liner plate 104. When the knife of the present embodiment is not used as a knife, the knife blade 6 is stored in a knife blade storing portion (not shown) formed between the partition liner plate 107 and the liner plate 104 of the handle 1. It is pulled out manually for use when necessary. As has been previously discussed, the base end 602 of the knife blade 6 is urged by the knife blade supporting portion 143 of the spring 106, thereby preventing the knife blade 6 from popping out accidentally when it is stored in the knife blade storing portion (not shown) and from being loose when it is out of the storing portion. The knife of the present embodiment is adapted to be a clasp knife, but may be modified to be a switch blade knife, or the like.

The knife of the present embodiment also includes the nipper 7. The nipper 7 has a hole 701 for receiving the blade-plyer pivoting pin 111, whereby it is pivotably supported and stored in a nipper storing portion (not shown) formed between the liner plate 104 and the partition liner plate 107 in a similar manner to the knife blade 6. The base end 702 of the nipper 7 is urged by the nipper supporting portion 145 of the spring 105, thereby preventing the nipper 7 from popping out accidentally when it is stored in the nipper storing portion (not shown) and from being loose when it is out of the storing portion. The present invention may be modified such that the nipper 7 is not formed in the knife, or such that other types of manual tools may be stored.

Moreover, in the knife of the present embodiment, the fly-tying vice 2 is pivotably supported by the handle 1 by the vice pivoting pin 108, whereby the fly-tying vice 2 can be stored and removed in and out of the fly-tying vice storing portion 140. However, the present invention may be modified in other constructions as far as the fly-tying vice 2 is stored in the handle 1, and the former is supported by the latter when it is pulled out. For example, instead of connecting the fly-tying vice 2 to the handle 1 by the vice pivoting pin 108 as shown in this embodiment, male and female screws may be formed in the base end of the fly-tying vice 2 and in the side of the handle 1, respectively, thereby supporting the fly-tying vice 2 to the handle 1 when the former is pulled out of the latter.

A use of the knife of the present embodiment will now be described. The fly-tying vice 2 is first pulled out of the fly-tying vice storing portion 140. The main screw 205 is turned so that the mouth pieces 201 and 202 clamp a hook securely. At this time, the hook may be only temporarily clamped by the function inherent in the spring 209 as has been previously discussed, and then it may be moved to a desired position by an operator. Thereafter, the hook may be secured firmly by the main screw 205. The spacing between the arms 203 and 204 can be adjusted by the subsidiary screw for subtle-adjusting 206 if necessary so as to maintain the overall spacing equally therebetween. Then, the hackle-plyer 3 is pulled out of the hackle-plyer storing portion 139, and the hook is further clamped by the mouth pieces 201 and 202 by the use of the wrench hole 301 of the hackle-plyer 3. Then, it is possible to carry out various operations of producing a fly by using the hook secured to the mouth pieces 201 and 202.

Consequently, the knife of the present embodiment as described above offers the following advantages.

The handle 1 is held with two or three fingers, and thus, it is possible to produce a fly with the remaining 7 or 8 fingers. Also, the operations can be carried out while the hackle-plyer 3, the scissors 4 and the half-hitcher 5 are pulled out and returned to the knife as desired. Thus, an operator can produce a fly easily even while standing.

It is possible to turn the main screw 205 tightly and easily by the wrench hole 301, and the fly-tying vice 2 can be made in a compact-sized so as to be stored in the handle 1 without impairing the easy and secure clamping of the hook.

Also, since the hackle-plyer 3, the scissors 4 and the half-hitcher 5 are stored in the handle 1, a single knife includes the basic tools required for producing a fly. Hence, it is convenient to carry such a knife outdoors rather than to carry the individual tools.

Further, the subsidiary screw for subtle-adjusting 206 is capable of preventing the following disadvantage. The arms 203 and 204 are titled, thereby making the spacing between the arms 203 and 204 adjacent to the mouth pieces 201 and 202 wider and the spacing therebetween adjacent to the hole 220 narrower. Due to this uneven spacing, the hook cannot be fully clamped. In order to avoid this, the subsidiary screw 206 functions for equally maintaining the overall spacing between the arms 203 and 204.

In addition, the hook can be temporarily clamped by the spring 209, and then moved to a desired position by the fingers by an operator. Thereafter, the main screw 205 is turned tightly, thereby clamping the hook by the mouth pieces 201 and 202 securely. As a result, the operations of producing a fly can be carried out easily.

What is claimed is:

1. A knife comprising:
   a knife blade;
   a handle storing said knife blade; and
   a fly-tying vice stored in said handle and supported by said handle when it is pulled out;
   said fly-tying vice including two arms forming their respective mouth pieces at one end for clamping a hook; a screw portion disposed adjacent to said mouth pieces of said arms for bringing said two arms closer to each other so as to allow said two mouth pieces to clamp said hook; and screw tightening tool stored in said handle for turning said screw portion for tightening.

2. A knife set forth in claim 1, wherein said screw tightening tool is a wrench for turning a top end of said screw portion for tightening.

3. A knife comprising:
   a knife blade;
   a handle storing said knife blade; and
   a fly-tying vice stored in said handle and supported by said handle when it is pulled out;
   said fly-tying vice including two arms forming their respective mouth pieces at one end for clamping a hook; a screw portion disposed adjacent to said mouth pieces of said arms for bringing said two arms closer to each other so as to allow said two mouth pieces to clamp said hook; and screw tightening tool stored in said handle for turning said screw portion for tightening; and
   said handle storing at least one of scissors, a hackle-plyer and a half-hitcher.

4. A knife set forth in claim 3, wherein said screw tightening tool is arranged in one of said scissors, said hackle-plyer and said half-hitcher stored in said handle.

5. A knife comprising:
   a knife blade;
   a handle storing said knife blade; and
   a fly-tying vice stored in said handle and supported by said handle when it is pulled out;
   said fly-tying vice including two arms forming their respective mouth pieces at one end for clamping a hook; a screw portion disposed adjacent to said mouth pieces of said arms for bringing said two arms closer to each other so as to allow said two mouth pieces to clamp said hook; a screw tightening tool stored in said handle for turning said screw portion for tightening; and spacing adjusting means for adjusting spacing between said two arms in order to prevent the spacing between said two arms closer to the other end than to said screw portion of said two arms from being made narrower than the desired spacing.

6. A knife comprising:
   a knife blade;
   a handle storing said knife blade; and
   a fly-tying vice stored in said handle and supported by said handle when it is pulled out;
   said fly-tying vice including two arms forming their respective mouth pieces at one end for clamping a hook; a screw portion disposed adjacent to said mouth pieces of said arms for bringing said two arms closer to each other so as to allow said two mouth pieces to clamp said hook; a screw tightening tool stored in said handle for turning said screw portion for tightening; and an elastic member disposed between said two arms closer to the other end than said screw portion, said elastic member urging said two arms away from each other.

7. A knife set forth in claim 6, wherein said fly-tying vice includes guide pins for guiding the clamping operation of said mouth pieces, said guide pins each disposed on either side of said screw portion on one of said two arms, and guide holes for receiving said guide pins, said guide holes disposed on the other arm.

* * * * *